United States Patent
El Moussaoui et al.

[11] Patent Number: 5,840,192
[45] Date of Patent: Nov. 24, 1998

[54] SINGLE-FILM MEMBRANE, PROCESS FOR OBTAINING IT AND USE THEREOF

[75] Inventors: Rachid El Moussaoui, Brussels; Henri Hurwitz, Rhode-Saint-Genese, both of Belgium

[73] Assignee: Universite Libre de Bruxelles, Brussels, Belgium

[21] Appl. No.: 505,348

[22] PCT Filed: Feb. 21, 1994

[86] PCT No.: PCT/BE94/00014

§ 371 Date: May 13, 1996

§ 102(e) Date: May 13, 1996

[87] PCT Pub. No.: WO94/19399

PCT Pub. Date: Sep. 1, 1995

[30] Foreign Application Priority Data

Feb. 24, 1993 [BE] Belgium .................................. 9300174

[51] Int. Cl.⁶ .................................................. B01D 15/04
[52] U.S. Cl. .............. 210/638; 210/500.25; 210/500.36; 210/500.42; 521/27; 204/520
[58] Field of Search .............................. 210/638, 500.25, 210/490, 500.36, 654, 649, 500.42; 521/27; 204/520, 180.2, 296, 182.4

[56] References Cited

U.S. PATENT DOCUMENTS

| | | | |
|---|---|---|---|
| 3,647,086 | 3/1972 | Mizutani et al. | 204/296 |
| 3,847,772 | 11/1974 | Sata et al. | 204/296 |
| 4,057,481 | 11/1977 | Lee et al. | 204/296 |
| 4,200,538 | 4/1980 | Seita et al. | 521/27 |
| 4,253,900 | 3/1981 | Dege et al. | 210/506 |
| 4,262,041 | 4/1981 | Eguchi et al. | 521/27 |
| 4,355,116 | 10/1982 | Lee et al. | |
| 4,715,691 | 12/1987 | Sata et al. | 350/357 |
| 5,114,554 | 5/1992 | Voss et al. | 204/182.4 |
| 5,389,449 | 2/1995 | Afeyan et al. | 210/500.34 |
| 5,401,408 | 3/1995 | Uremura et al. | 210/490 |

FOREIGN PATENT DOCUMENTS

| | | |
|---|---|---|
| 0459820 | 5/1991 | European Pat. Off. . |
| 981562 | 11/1961 | United Kingdom . |
| 1588542 | 7/1977 | United Kingdom . |
| 2122543 | 6/1983 | United Kingdom . |
| WO89/01059 | 7/1988 | WIPO . |

*Primary Examiner*—Ana Fortuna
*Attorney, Agent, or Firm*—Knobbe Martens Olson & Bear LLP

[57] ABSTRACT

A single-film membrane including at least one hydrophilic interface for breaking water down into is components, and including one or more inorganic compounds. A method for preparing and using the membrane for producing acids and bases, controlling pH and/or electodialyzing and aquous solution, is also provided.

24 Claims, 2 Drawing Sheets

SINGLE-FILM MEMBRANE, PROCESS FOR OBTAINING IT AND USE THEREOF

SUBJECT OF THE INVENTION

The invention relates to a new single-film membrane, to a process for obtaining it and to its use for the production of bases and acids, for pH control and/or for the electrodialysis of an aqueous solution.

State of the art and technological background underlying the invention

Acids and bases can be produced from their salts by electrolysis or electrodialysis.

Under the effect of the application of a potential, these processes make it possible to form in an aqueous medium, starting, for example, from sodium chloride, hydrochloric acid (HCl) and caustic soda (NaOH).

Bipolar ion-exchange membranes are employed in electrodialysis for obtaining these different components.

Various types of bipolar membranes have been proposed. Membranes of double-film type consist of two monofunctional membranes, a cationic exchange membrane and an anionic exchange membrane, which are joined side by side. In another type of membrane a cationic exchange film is covered on one face with a coating including anionic exchange groups.

Bifunctional single-film bipolar membranes consist of a polymeric membrane including a cationic exchange portion and an anionic exchange portion.

Patent Application GB-2,122,543 describes a double-film membrane consisting of a cation exchange film and of an anion exchange film which are treated so that the interface of the bipolar membrane consisting of the two films which are joined together contains one or a number of inorganic compounds capable of dissociating water into its components $H^+$ and $OH^-$.

The compounds consist of one of the cations of group 1a to group 4a, of the lanthanides and actinides of the Periodic Table. The anion is chosen from the group of tetraborates, metaborates, silicates, metasilicates, tungstates, chlorates, phosphates, sulphates, chromates, hydroxyl, carbonates, molybdates, chloroplatinates, orthovanadates and tellurates.

Document Electrochimica Acta vol. 31, pages 1175–1176 (1986) describes a process consisting in coating the surfaces of functionalized single-film membranes before they are joined together with the aid of a solution containing at least one of the following electrolytes: sodium tungstate, chromic nitrate, sodium metasilicate, ruthenium trichloride, indium sulfate, cerous sulfate, sodium chromate, stannous chloride, sodium dihydrogenphosphate, thorium nitrate and zirconium chloride.

According to document AU-B-88/2257, bipolar membranes can be produced in various ways.

According to a first embodiment the anionic membrane and the cationic membrane are subjected to a pretreatment with an aqueous solution containing at least one monovalent or polyvalent cation other than sodium and potassium, the solution having an alkaline pH, and the pretreated membranes are next arranged together, one facing the other.

According to a second embodiment, characterized by a scission of a pretreatment into two steps, the anionic membrane and the cationic membrane are subjected to a pretreatment with an aqueous solution containing at least one monovalent or polyvalent cation other than sodium and potassium, the pretreated membranes are next subjected separately to a treatment with an alkaline solution and are arranged together one facing the other.

According to a third embodiment the anionic membrane and the cationic membrane are subjected to a pretreatment with an aqueous solution containing at least one monovalent or polyvalent cation other than sodium and potassium, the pretreated membranes are next arranged together one facing the other to form a bipolar membrane and this bipolar membrane is then treated with an alkaline solution.

In this process the pretreatment of the membranes, which can be performed at ambient temperature, is preferably performed with heating at temperatures ranging from 60° C. tp 100° C.

However, these types of double-film membranes exhibit the disadvantage of having an interface resulting from being joined together, which must have excellent adhesion properties, must be capable of containing a catalyst in the form of an inorganic compound and must be hydrophilic and exhibit a very low electrical resistance.

The manufacture of this type of membrane remains therefore extremely tricky. Their endurance is lessened by their ability to become separated or to form pockets in the region of the interface, which impairs their chemical and electrical performance and their mechanical stability when they are being employed.

Patent Application GB-981,562 describes a process for the preparation of a bipolar single-film membrane, in which the polyolefins of the polymer matrix of the said membrane are functionalized by chlorosulfonation.

Patent Application U.S. Pat. No. 4,355,116 describes a process for the preparation of a bipolar single-film membrane, in which a polymeric matrix grafted with styrene and crosslinked with divinylbenzene is functionalized on one side by a chlorosulfonation and a hydrolysis and, on the other side, by a chloromethylation followed by an amination with a polyamine and with a multifunctional amine.

Patent Application GB-1,588,542 describes a process for the treatment of the surface of a single-film membrane in which the polymeric matrix consists of a polymer of an olefin and of polystyrene, crosslinked with divinylbenzene. This surface treatment is intended to render the aromatic groups of the said polymeric matrix more accessible to functionalization by chlorosulfonation and to hydrolysis on one side and on the other side by chloromethylation followed by amination.

However, in the single-film membranes obtained by these processes it is difficult to obtain a clean front between the cation exchange portion and the anion exchange portion because they interpenetrate and thus create an interface of high electrical resistance.

Also, such single-film membranes exhibit an electrical resistance which is too high to be capable of being employed industrially in the production of base and acid by electrodialysis.

OBJECTIVES OF THE PRESENT INVENTION

The present invention is aimed at providing a new membrane which does not exhibit the disadvantages of the abovementioned state of the art, in particular a membrane devoid of regions liable to form pockets or vesicles, and mechanically more stable. What is looked for in particular is a low electrical resistance and a Faraday efficiency higher than 80% and preferably higher than 90%, and a water dissociation potential lower than 1.8 V, preferably lower than 1.3 V.

Another objective of the present invention is to obtain a membrane which can be employed in any direction whatever, that is to say of not being dependent on a preferred orientation when it is inserted into an electro-dialyser.

Another objective of the present invention is to develop a new process for the preparation of such a membrane.

Characteristic elements of the invention

The present invention relates to a single-film membrane comprising at least one hydrophilic interface capable of dissociating water into its components $H^+$ and $OH^-$ and comprising one or a number of inorganic compounds.

The inorganic compound is advantageously chosen from the group consisting of salts and/or hydroxides containing a monovalent or polyvalent metal cation or the ammonium ion.

Said inorganic compound is preferably chosen from the salts or hydroxides of the elements of columns 1a to 2a, of the transition elements, of the elements belonging to the lanthanide groups, of the elements belonging to the actinide groups of Mendeleev's table and/or a mixture thereof.

Said inorganic compound is preferably a derivative from the group consisting of the salts and/or hydroxides of titanium, zirconium, vanadium, niobium, chromium, molybdenum, tungsten, manganese, iron, ruthenium, osmium, cobalt, rhodium, nickel, paladium [sic], copper, silver, zinc, cadmium, lanthanum, cerium, thorium and/or a mixture thereof.

The salt is advantageously formed from one or more oxyanions.

This salt is preferably chosen from the group consisting of tetraborates, metaborates, silicates, metasilicates, tungstates, chlorates, phosphates, sulfates, nitrates, chromates, carbonates, molybdates, chloroplatinates, orthovanadates, tellurates and/or a mixture thereof.

The single film of the membrane according to the invention is advantageously a polymeric matrix consisting of polymers derived from the monomers chosen from the group consisting of

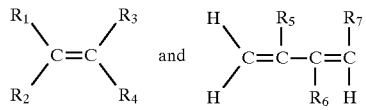

in which $R_1$ to $R_7$ are substituents chosen from the groups consisting of hydrogen, chlorine, fluorine, alkyl radicals containing 1 to 5 carbon atoms, phenyl radicals, the copolymers thereof and the chlorine-containing and/or fluorine-containing polymers and/or copolymers thereof. The polymer is preferably chosen from the group consisting of polyethylene (PE), polyvinyl chloride (PVC), Teflon® (polytetrafluoroethylene or PTFE), poly(vinylene difluoride) [sic] (PVDF), ethylenetetrafluoroethylene [sic] (ETFE), polypropylene (PP), poly(fluoroethylene propylene) (PFEP) and/or a mixture thereof.

The polymer or polymers of the polymeric matrix are preferably grafted with styrene and crosslinked with divinylbenzene (DVB).

The membrane according to the invention advantageously includes one or a number of inorganic compounds introduced at the hydrophilic interface and/or into an ion exchange layer of the membrane by electrodialysis, by diffusion and/or by conditioning.

The membrane according to the invention preferably has a thickness of between 50 and 150 microns.

According to a first embodiment of the invention the single-film membrane is a bipolar membrane comprising an anion exchange layer and a cation exchange layer.

The cation exchange layer of the membrane is obtained by chlorosulfonation and hydrolysis in basic medium, and the anion exchange face of the membrane is obtained by chlorosulfonation and amination, with formation of a quaternary ammonium compound.

92 to 50% of said membrane preferably constitutes the cation exchange face and is chlorosulfonated and hydrolyzed with a basic solution, and 8% to 50% of said membrane constitutes the anion exchange face and is chlorosulfonated and aminated with formation of quaternary ammonium.

According to a second embodiment of the invention the membrane is an ambibipolar membrane comprising a cation exchange layer inserted between two anion exchange layers.

The invention also relates to a process for obtaining the single-film bipolar membrane, characterized in that a single-film membrane consisting of a polymeric matrix is subjected to a chlorosulfonation treatment on its two faces, followed by an amination treatment of one of the faces of the membrane and a quaternization; the other face undergoing a hydrolysis in basic medium and one or a number of inorganic compounds of the above-mentioned type are caused to enter at the hydrophilic interface and/or into an ion exchange layer of said membrane.

The invention also relates to a process for obtaining a single-film ambibipolar membrane, in which a single-film membrane consisting of a polymeric matrix is subjected to a chlorosulfonation treatment on its two faces, followed by an amination treatment of the two faces; the membrane is next subjected to a hydrolysis in basic medium and to a quaternization of the amino groups, and one or a number of inorganic compounds of the above-mentioned type are caused to enter at the hydrophilic interface and/or into an ion exchange layer of said membrane.

Advantageously, according to the invention one or a number of inorganic compounds are caused to enter the single-film membrane by electrodialysis, by diffusion and/or by conditioning.

The chlorosulfonation treatment is preferably performed by soaking the membrane in a solution of chlorosulfonic acid in an organic solvent and the amination treatment is performed by running a solution containing a molecule chosen from the group consisting of a diamine, a polyamine and/or a mixture of a number of polyamines over one or more of the faces of the membrane.

In the abovementioned process the hydrolysis in basic medium is performed using a solution of NaOH or of KOH.

The single-film membrane according to the invention can be employed for the production of acids and bases, and for the control of the pH and/or for the electrodialysis of an aqueous solution.

DESCRIPTION OF A PREFERRED EMBODIMENT OF THE INVENTION

The present invention is based on the advantage offered by a single-film membrane including a hydrophilic interface comprising one or a number of inorganic compounds, for the production of acids and bases.

The terms "hydrophilic interface" are intended to mean a portion of the membrane arranged between an anion exchange layer and a cation exchange layer and which is capable, in the case of an appropriate direction of the current, of dissociating water into its components $H^+$ and $OH^-$.

The single-film membrane-according to the invention may be a bipolar membrane or an ambibipolar (or reversible) membrane.

Figure 1:
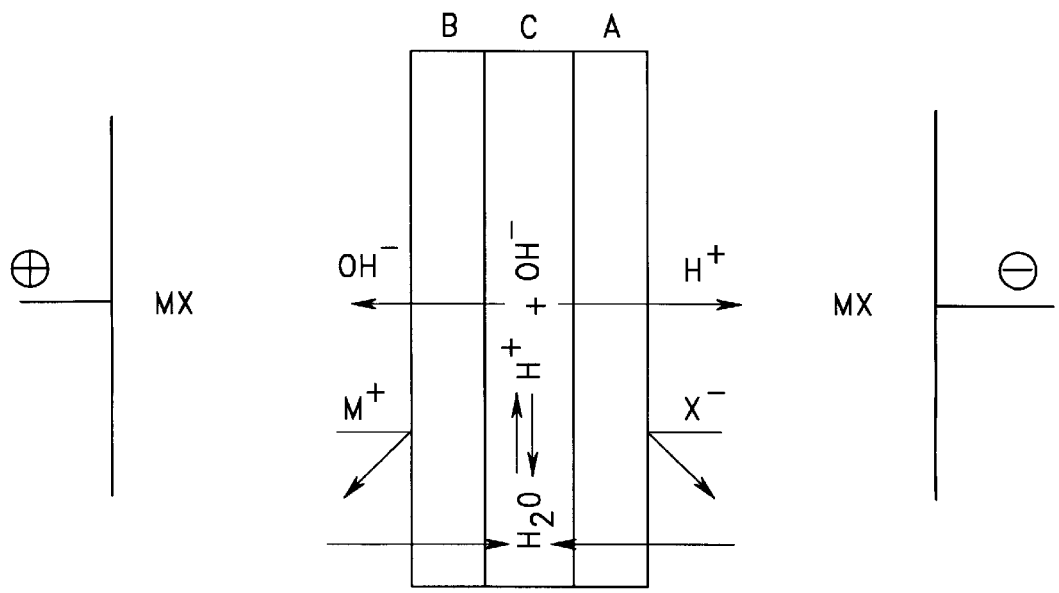
FIG. 1 shows diagrammatically the formation of acid and of base by a membrane according to the invention, arranged between an anode and a cathode in an aqueous solution of a salt.

A bipolar membrane as shown in FIG. 1 comprises, between a cation exchange layer (A) and an anion exchange layer (B), the hydrophilic interface (C) capable of dissociating water into its components $H^+$ and $OH^-$.

An ambipolar (or reversible) membrane according to the present invention includes a cation exchange layer (A) arranged between two anion exchange layers (B).

Figure 2:
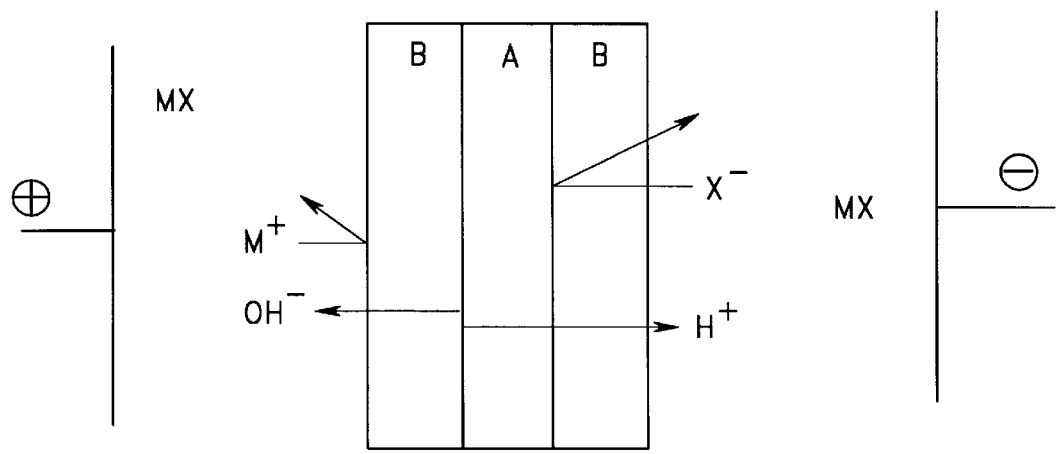
FIG. 2 shows diagrammatically the formation of acid and base by an ambibipolar (or reversible) membrane arranged between an anode and a cathode in an aqueous salt solution.

An ambibipolar membrane comprises at least one hydrophilic interface which, when the membrane is arranged between electrodes, dissociates water into its components $H^+$ and $OH^-$ (cf. FIG. 2).

The present invention will be described in greater detail in the following examples, given solely by way of nonlimiting illustration of the present invention.

EXAMPLE 1

The polymeric matrix of the single film forming the membrane consists of ethylenetetrafluoroethylene [sic] (ETFE) grafted with styrene (Cg=48.5%) and cross-linked with divinylbenzene (DVB)

The functionalization of this matrix is performed in the following steps:

swelling of the membrane immersed in an organic solvent ($CCl_4$) at ambient temperature for a period of 24 hours;

chlorosulfonation of the two faces of the membrane, which is immersed in a solution containing 10% of chlorosulfonic acid ($HClSO_3$) in $CCl_4$ and at ambient temperature. The period of chlorosulfonation is 10 hours with magnetic stirring;

rinsing of the chlorosulfonated film immersed in an organic solvent (anhydrous ether) for 3 to 4 hours;

amination of one face of the membrane by allowing a certain quantity (1 ml/4 $cm^3$ of the membrane area) of a diamine $NH_2$—$(CH_2)_3$—$NCH_3CH_3$ to flow at ambient temperature and for 30 minutes;

quaternization of the tertiary amine by rinsing the membrane in methanol and then soaking it in a solution of 5 to 10% of $CH_3I$ in methanol, at ambient temperature with magnetic stirring for six hours;

hydrolysis of the other face of the membrane.

The chlorosulfonated membrane, aminated and quaternized on one face is conditioned in an, NaOH (10%) solution at ambient temperature for 12 hours and is then conditioned twice for 6 hours in 1N HCl and for 6 hours in 10% NaOH.

The membrane thus obtained is a bipolar membrane in which the cation exchange portion comprises sulfonates and the anion exchange portion comprises quaternary ammoniums.

The exchange capacity of the membrane is expressed for each of the layers by the-number of ion exchange sites per gram of the bipolar membrane.

With a view to carrying out the conditioning, the bipolar membrane is treated in a solution of an $Ni^{2+}$, $CO^{2+}$, $Cr^{3+}$, $Rh^{3+}$, $Zr^{3+}$, $Ce^{3+}$ or $Ru^{3+}$ salt or of a mixture thereof at a concentration of 5% to 15% by weight per volume of distilled water.

This incorporation is supplemented, for example, by an electrodialysis or equilibration process with heating in an alkaline solution, preferably 10% NaOH.

The conditioning time is 20 hours.

After the conditioning the membrane is swollen in a solution containing 10% of NaOH by weight per volume of distilled water at a temperature of 70° C. for 30 minutes.

The transmembrane potential difference recorded at values of 100 mA/$cm^2$ is 2.3 V.

The Faraday efficiency in a 1M NaCl medium with stirring and at 100 mA/$cm^2$ is 85%.

EXAMPLE 2

A single-film membrane of a polyethylene (HDPE), PVDF or ETFE polymer (exhibiting a content of grafting with styrene of 64%) is prepared according to the same operating method as in the preceding example, the period of chlorosulfonation being extended to 15 hours.

The ion exchange capacity of the cationic layer is Cc=2.16 meq/g.

The ion exchange capacity of the anionic layer is Ca=0.35 meq/g.

This membrane is next treated in order to incorporate therein an inorganic compound (catalyst) taking part in the water dissociation step.

The incorporation of the inorganic compound is performed by conditioning according to the same operating method as described above, followed by a process of electrodialysis or a process of equilibration with heating in a 10% NaOH alkaline solution.

In an electrodialysis process the membrane obtained is conditioned in a 0.1M solution of $Cr(NO_3)_3$ 9$H_2O$ for 24 hours and at ambient temperature. After the conditioning, the $Cr^{3+}$ adsorbed is desorbed in distilled water with stirring for 3 hours.

The bipolar membrane according to the invention is placed in an electrodialyser with two compartments, with the cation exchange face directed towards an anode and the anion exchange face directed towards a cathode.

The anionic compartment contains a 0.1N solution of HCl and the cationic compartment contains a 0.1N solution of KOH.

The electrodialysis is performed at a current density of 10 mA/$cm^2$ for 10 minutes.

The transmembrane potential difference at 100 mA/$cm^2$ is stable at values lower than 2 V.

In the case where the incorporation of the inorganic compound is performed by equilibration with heating (70° C.), the transmembrane potential difference recorded at values of 100 mA/$cm^2$ lies below 1.3 V and generally at 1.1 V. The Faraday efficiency in 1M NaCl medium and at 100 mA,/$cm^2$ is equal to or higher than 80% and at 150 mA/$cm^2$ in 20% NaOH medium on the anodic side and 4% HCl on the cathodic side is higher than 92%. The properties of the membrane remain constant during a period of experimentation of several weeks.

EXAMPLE 3

A styrene-filled high-density polyethylene film crosslinked with divinylbenzene ($C_G$=60%, $C_C$=10%) is left to swell in $CCl_4$ at ambient temperature for four days. It is chlorosulfonated in a 10% chlorosulfonic acid/carbon tetrachloride mixture at ambient temperature for 38 to 40 hours. The film is next rinsed in anhydrous ether for about ten minutes. On the film treated in this way, a certain quantity of a pure diamine $NH_2$—$(CH_2)_3$—$N(CH_3)_2$ (0.7 ml per $cm^2$ of membrane area) is allowed to flow over one of the faces for two hours at ambient temperature. Thus prepared, the membrane is rinsed with distilled water and left to swell in methanol for four to six hours. It is next hydrolyzed in a 0.1N NaOH solution at 50° C. for 18 hours. This step is followed by rinsing with water and quaternization in a 10% $CH_3I/CH_3OH$ solution at 40° C. for 20 hours. After this treatment the membrane is swollen in 0.1N NaOH for 24 hours at ambient temperature.

The conditioning of the bipolar membrane thus obtained is performed by impregnation in an aqueous solution containing 15% $Cr(NO_3)_3$ at ambient temperature, followed by swelling in a 10% NaOH solution at 70° C. for 30 minutes.

The transmembrane potential difference recorded at values of 100 $mA/cm^2$ in 1M NaCl symmetric medium lies below 1.3 V and generally at 1.1 V. The Faraday efficiency in 1M NaCl symmetric medium and at 100 $mA/cm^2$ is equal to or higher than 87% and at 150 $mA/cm^2$ in 20% NaOH medium on the anodic side and 5% HCl on the cathodic side is higher than 98%. The properties of the membrane are maintained during a period of experimentation of several weeks.

EXAMPLE 4

A membrane is treated in the same way as in Example 3, except that in the amination stage the pure diamine $H_2N$—$(CH_2)_3$—$N(CH_3)_2$ is replaced with pure 1,3-diaminopropane $H_2N$—$(CH_2)_3$—$NH_2$ or with a mixture of these two diamines.

EXAMPLE 5

An ambibipolar membrane is prepared with a styrene-filled HDPE single-film polymeric matrix like that employed in Example 3 and is treated in the same way as described in Example 3, except insofar as the amination step is concerned, where the two faces of the membrane are placed into contact by soaking with a solution of pure 1,3-diaminopropane for thirty minutes. The $Cr(NO_3)_3$ $9H_2O$ catalyst is introduced by conditioning and diffusion with heating.

EXAMPLE 6

The inorganic compound may also be introduced according to the invention at ambient temperature into the membrane by conditioning it in 1M NaCl at ambient temperature and by placing it in an electrodialyser with two compartments with the anionic exchange portion facing the cathode. The catholyte consisting of a 1M NaOH solution and the cationic exchange portion facing the anode, the anolyte including a solution of 1M HCl and 1M $Cr(NO)_3$ $9H_2O$ [sic] in a volume ratio of 1/10. The current density applied for 30 minutes is 25 $mA/cm^{-2}$ [sic].

The bipolar membrane thus produced exhibits a transmembrane potential difference recorded at values of 100 $mA/cm^2$ below 1.5 V and generally of 1.3 V. The Faraday efficiency in 1M NaCl medium and at 100 $mA/cm^2$ is equal to or higher than 92%.

The single-film membrane according to the invention exhibits the twin advantage of possessing a high mechanical strength and a low electrical resistance.

It appears, in fact, that when one or a number of inorganic compounds are incorporated (as catalyst) at the interface of the cation exchange face and of the anionic exchange face, into a bipolar single-film membrane, it is possible to reduce considerably the electrical resistance of said membrane.

The single-film membrane according to the invention exhibits the advantage of being mechanically stronger and easier to handle than a double-film membrane prepared according to the processes of the state of the art.

The single-film membrane according to the invention also makes it possible to guarantee good permeability of water from the external solution towards the hydrophilic central interface comprising the inorganic compound or compounds.

This hydrophilic interface advantageously has a low thickness so as to permit a more efficient dissociation of the water, followed by a diffusion of the $H^+$ and $OH^-$ ions towards the external solutions.

The single-film membrane described above has the advantage of being obtained by simple chlorosulfonation over its whole thickness and of exhibiting a clean interface which is hospitable to the catalyst, between the sulfonamide portion, subsequently converted into ammonium sites, and the sulfonated portion, this being according to a process of synthesis which is low in cost and without major difficulties.

In addition, the single-film membrane according to the invention exhibits an energy efficiency which is comparable, or even better than that of a double-film membrane of the state of the art.

Furthermore, the membrane according to the invention of ambibipolar or reversible type, exhibits the advantage of being capable of being employed in both directions, that is to say of not depending on any preferred orientation when it is inserted into an electrodialyser (cf. FIG. 2). This property has the advantage of eliminating any handling error.

Figure 3:
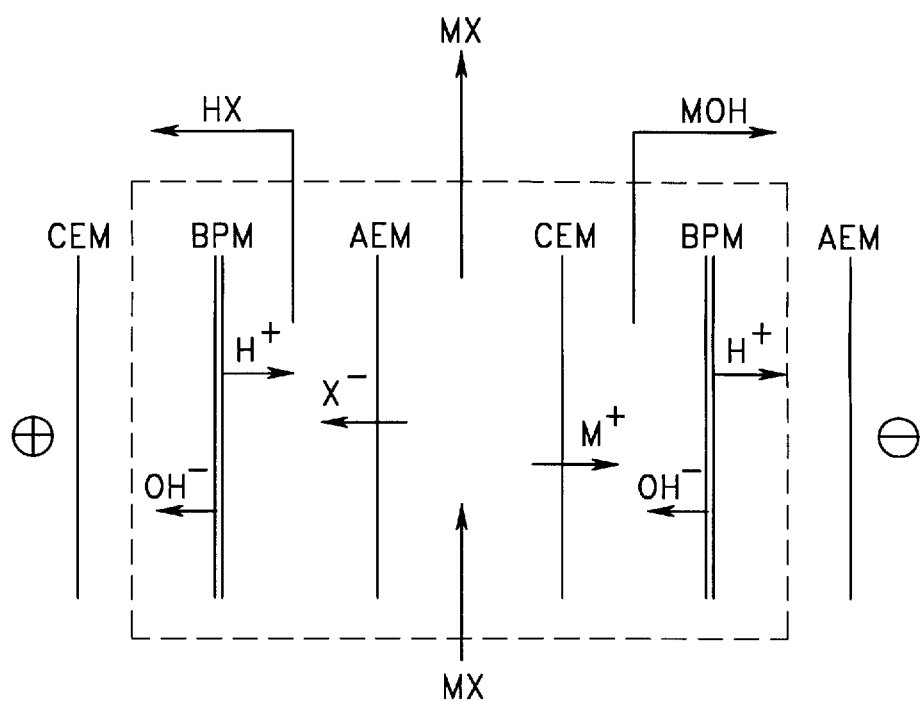
FIG. 3 shows diagrammatically a cell with three compartments including single-film membranes according to the invention for the production of acid and base.

The production of acid and of base can be obtained by single-film membranes according to the invention which are introduced into conventional cells with three compartments arranged between an anode and a cathode as shown in FIG. 3.

Each single-film membrane (BPM) according to the invention encloses an anion exchange membrane (AEM) and a cation exchange membrane (CEM) between which there is an aqueous salt solution (MX). The acid (OX) and the base (MOR) are formed in the compartments situated between the single-film membranes according to the invention and the anion and cation exchange membranes.

The single-film membrane according to the invention can also be employed for the control of the pH of an aqueous solution.

The single-film bipolar membrane according to the invention can also be employed in the open direction of the current in the case of an electrodialysis, where it plays the part of a cation-selective membrane with a high selectivity in favour of monovalent metal cations and the rejection of the di- and multivalent metal cations.

We claim:

1. A single-film membrane made of a single polymeric matrix comprising a hydrophilic interface formed therein, said hydrophilic interface being capable of dissociating into H and OH, wherein said membrane comprises one or more inorganic compounds selected from the group consisting of a salt of an element of column 2a, a salt of a transition element, a salt of an element belonging to the lanthanide groups, a salt of an element belonging to the actinide groups of Mendeleev's Table, a hydroxide of an element of column 2a, a hydroxide of an element belonging to the actinide groups of Mendeleev's Table, and a mixture of any of the foregoing, in an amount effective to reduce the electrical resistance and the water dissociation potential ad to increase the, Faraday efficiency of said membrane.

2. A membrane according to claim 1, wherein the inorganic compound is selected from the group consisting of a salt of titanium, zirconium, vanadium, niobium, chromium, molybdenum, tungsten, manganese, iron, ruthenium, osmium, cobalt, rhodium, nickel, palladium, copper, silver, zinc, cadmium, lanthanum, cerium, thorium, a hydroxide of titanium, zirconium, vanadium, niobium, chromium, molybdenum, tungsten, manganese, iron, ruthenium, osmium, cobalt, rhodium, nickel, palladium, copper, silver, zinc, cadmium, lanthanum, cerium, thorium, and a mixture of any of the foregoing.

3. A membrane according to claims 1, wherein the salt is formed form one or more oxyanions.

4. A membrane according to claim 3, wherein the salt is selected from the group consisting of a tetraborate, a metaborate, a silicate, a metasilicate, a tungstate, a chlorate, a phosphate, a sulfate, a nitrate, a chromate, a carbonate, a molybdate, a chloroplatinate, a orthovanadate, a tellurate, and a mixture of any of the forgoing.

5. A membrane according to claim 1, wherein the single-film membrane comprises a polymeric matrix comprising one or more polymers.

6. A membrane according to claim 5, wherein the matrix comprises polymers selected from the group consisting of polyethylene, polyvinyl chloride, polytetrafluoroethylene, poly(vinylene difluoride), ethylenetetrafluoroethylene, polysterene, polypropylene, poly (fluoroethylene propylene) and mixtures of any of the foregoing.

7. A membrane according to claim 5, wherein the one ore more polymers of the polymeric matrix are grafted with styrene.

8. A membrane according to claim 5, wherein the one ore more polymers of the matrix are cosslinked with divinylbezene.

9. A membrane according to claim 1, wherein said one ore more inorganic compounds are introduced at the hydrophilic interface by electrodialysis, by diffusion and/or by conditioning.

10. The membrane according to claim 1, wherein said membrane has a thickness of between 50 and 150 microns.

11. A membrane according to claim 1, wherein said membrane is a bipolar membrane comprising an anion exchange layer and a cation exchange layer, between which said hydrophilic interface is interposed.

12. A membrane according to claim 11, wherein 50% to 92% of the membrane constitutes the cation exchange layer, said cation exchange layer being chlorosulfonated ad hydrolyzed with a basic solution, and wherein 8% to 50% of the membrane constitutes the anion exchange layer, said cation exchange layer being chlorosulfonated and aminated with the formation of quaternary ammonium.

13. A membrane according to claim 1, wherein said membrane is an ambibipolar membrane comprising a cation exchange layer inserted between two anion exchange layers.

14. A method of producing an acid and a base, comprising the steps of providing an anode and a cathode;
providing two single-film membranes according to claim 1, said single-film membranes being situated between said anode and said cathode;
providing an anion exchange membrane and a cation exchange membranes between said tow single-film membranes;
providing an aqueous solution between said anion exchange membrane and said cation exchange membrane, said aqueous solution comprising an anion and a cation; and
supplying an electric current between said anode and said cathode, thereby causing the production of an acid and a base, wherein said acid comprises said anion and said base comprises said cation.

15. A method of controlling the pH of an aqueous solution, comprising the step of exposing the aqueous solution to the single-film membrane of claim 1.

16. A method of performing electrodialysis of an aqueous solution, comprising the steps of:
providing an anode and a cathode;
providing a single-film membrane according to claim 1, said single-film membrane being situated between said anode and cathode;
providing an aqueous solution in contact with at least a fist side of said membrane, said aqueous solution comprising an anion and a cation; and
supplying an electric current between said anode and said cathode, thereby causing the electrodialysis of said aqueous solution.

17. A membrane according to claim 1, which has a Faraday efficiency of 80% or higher and a water dissociation potential of 1.8 V or lower.

18. A process for obtaining a single-film bipolar membrane, said membrane comprising a first face and a second face, comprising the steps of:
subjecting a single-film membrane comprising a polymeric matrix to a chlorosulfonation treatment on both faces of said membrane;
subjecting said first face of said membrane to an amination treatment and a quaternization treatment;
subjecting said second face to a hydrolysis treatment in a basic medium; and
incorporating one or more inorganic compound into said membrane in an amount effective to reduce the electrical resistance and the water dissociation potential and to increase the Faraday efficiency of said membrane, said one ore more inorganic compounds being selected from the group consisting of a salt of an element of column 2a, a salt of a transition element, a salt of an element belonging to the lanthanide groups, a salt of an element belonging to the actinide groups of Mendeleev's Table, a hydroxide of an element of column 2a, a hydroxide of a transition element, a hydroxide of an element belonging to the lanthanide groups, a hydroxide of an element belonging to the actinide groups of Mendeleev's Table, and mixture of any of the foregoing.

19. A process for obtaining a single-film ambibipolar membrane according to claim 18, wherein after said single-film membrane comprising a polymeric matrix is subjected to a chlorosulfonation treatment on both faces of said membrane, said both faces are then subjected to amination treatment, after which the membrane is subjected to hydrolysis treatment in basic medium, and to a quaternization treatment of the amine groups.

20. A process according to claim 18, wherein one or more inorganic compounda are caused to enter the single-film by electrodalysis, by diffusion and/or conditioning.

21. A process according to claim 18, wherein the chlorosulfonation treatment is performed by soaking the membrane in a solution of chlorosulfonic acid in an organic solvent.

22. A process according to claim 18, wherein the amination treatment is performed by running a solution over one or both faces of the membrane, said solution containing a molecule selected from the group consisting of a diamine, a polyamine, and a mixture of polyamines.

23. A process according to claim 18, wherein the hydrolysis treatment in a basic medium is performed using a solution of NaOH or KOH.

24. A membrane according to claim 18, wherein the step of incorporating the organic compounds is conducted until the Faraday efficiency of the membrane reaches 80% or higher, and the water dissociation potential reaches 1.8 V or lower.

* * * * *